US011683280B2

(12) United States Patent
Desserrey et al.

(10) Patent No.: US 11,683,280 B2
(45) Date of Patent: *Jun. 20, 2023

(54) MESSAGING SYSTEM INCLUDING AN EXTERNAL-RESOURCE DOCK AND DRAWER

(71) Applicant: Snap Inc., Santa Monica, CA (US)

(72) Inventors: Laurent Desserrey, Los Angeles, CA (US); Dylan Shane Eirinberg, Venice, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,508

(22) Filed: Apr. 29, 2022

(65) Prior Publication Data

US 2022/0263779 A1 Aug. 18, 2022

Related U.S. Application Data

(63) Continuation of application No. 16/948,429, filed on Sep. 17, 2020, now Pat. No. 11,356,392.

(Continued)

(51) Int. Cl.
*G06F 15/16* (2006.01)
*H04L 51/04* (2022.01)
(Continued)

(52) U.S. Cl.
CPC ............ *H04L 51/04* (2013.01); *G06F 3/0482* (2013.01); *G06Q 10/107* (2013.01); *H04L 51/216* (2022.05); *H04M 2215/81* (2013.01)

(58) Field of Classification Search
CPC ....... H04L 51/04; H04L 51/16; G06Q 10/107; G06F 3/0482; H04M 22/1581

(Continued)

(56) References Cited

U.S. PATENT DOCUMENTS

| 5,880,731 A | 3/1999 | Liles et al. |
| 6,023,270 A | 2/2000 | Brush, II et al. |

(Continued)

FOREIGN PATENT DOCUMENTS

| CN | 1434623 A | 8/2003 |
| CN | 102868588 A | 1/2013 |

(Continued)

OTHER PUBLICATIONS

U.S. Appl. No. 15/818,430 U.S. Pat. No. 11,122,094, filed Nov. 20, 2017, Software Application Manager for Messaging Applications.

(Continued)

*Primary Examiner* — Anthony Mejia
(74) *Attorney, Agent, or Firm* — Schwegman Lundberg & Woessner, P.A.

(57) ABSTRACT

A conversation interface in a messaging application is displayed, the conversation interface being presented to participants in a conversation that is being conducted on the messaging application. The conversation interface is constructed by determining statuses of at least two external resources that have been launched, within the context of the messaging application, by one or more of the conversation participants. An external resource notification interface (or "dock") is displayed in the conversation interface, the external resource notification interface including icons corresponding to the at least two external resources. Upon user selection of the external resource notification interface, a list interface (or "drawer") including user-selectable cells corresponding to the at least two external resources is displayed.

20 Claims, 13 Drawing Sheets

Related U.S. Application Data

(60) Provisional application No. 63/037,460, filed on Jun. 10, 2020.

(51) Int. Cl.
 *G06Q 10/107* (2023.01)
 *G06F 3/0482* (2013.01)
 *H04L 51/216* (2022.01)

(58) Field of Classification Search
 USPC .......................................................... 709/206
 See application file for complete search history.

(56) References Cited

U.S. PATENT DOCUMENTS

| | | | |
|---|---|---|---|
| 6,223,165 B1 | 4/2001 | Lauffer | |
| 6,772,195 B1 | 8/2004 | Hatlelid et al. | |
| 6,789,109 B2 | 9/2004 | Samra et al. | |
| 6,842,779 B1 | 1/2005 | Nishizawa | |
| 7,053,924 B2 | 5/2006 | Ohkawa et al. | |
| 7,266,188 B2 | 9/2007 | Carlson | |
| 7,275,215 B2 | 9/2007 | Werndorfer et al. | |
| 7,342,587 B2 | 3/2008 | Danzig et al. | |
| 7,386,799 B1 | 6/2008 | Clanton et al. | |
| 7,468,729 B1 | 12/2008 | Levinson | |
| 7,483,961 B2 | 1/2009 | Affaki | |
| 7,549,924 B2 | 6/2009 | Canessa et al. | |
| 7,587,755 B2 | 9/2009 | Kramer | |
| 7,636,755 B2 | 12/2009 | Blattner et al. | |
| 7,639,251 B2 | 12/2009 | Gu et al. | |
| 7,775,885 B2 | 8/2010 | Van et al. | |
| 7,828,656 B2 | 11/2010 | Paulsen et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,037,139 B1 | 10/2011 | Fish et al. | |
| 8,088,044 B2 | 1/2012 | Tchao et al. | |
| 8,095,878 B2 | 1/2012 | Bates et al. | |
| 8,103,734 B2 * | 1/2012 | Galli ....................... | H04L 51/04 709/206 |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,429,711 B2 | 4/2013 | Kramer | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,706,824 B2 | 4/2014 | Davenport et al. | |
| 8,810,513 B2 | 8/2014 | Ptucha et al. | |
| 8,812,171 B2 | 8/2014 | Filev et al. | |
| 8,819,153 B1 | 8/2014 | Fish et al. | |
| 8,821,297 B1 | 9/2014 | Nagata et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,880,627 B2 | 11/2014 | Davenport et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,106,652 B2 | 8/2015 | Albouyeh et al. | |
| 9,106,657 B2 | 8/2015 | Albouyeh et al. | |
| 9,197,427 B2 * | 11/2015 | Chazin ................ | H04L 12/1822 |
| 9,241,184 B2 | 1/2016 | Weerasinghe | |
| 9,256,860 B2 | 2/2016 | Merger et al. | |
| 9,264,463 B2 | 2/2016 | Rubinstein et al. | |
| 9,277,502 B2 | 3/2016 | Moayerzadeh Ahmadi et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,355,186 B2 | 5/2016 | Khanna et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,380,012 B2 | 6/2016 | Davenport et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,553,832 B2 | 1/2017 | Blayer et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 * | 5/2018 | Chaudhri ............ | G06F 3/04842 |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,071,308 B2 | 9/2018 | Perlman | |
| 10,089,604 B2 | 10/2018 | Lasser et al. | |
| 10,097,492 B2 | 10/2018 | Tsuda et al. | |
| 10,116,598 B2 | 10/2018 | Tucker et al. | |
| 10,116,615 B2 | 10/2018 | Rubinstein et al. | |
| 10,140,001 B2 | 11/2018 | Langholz | |
| 10,155,168 B2 | 12/2018 | Blackstock et al. | |
| 10,225,700 B2 | 3/2019 | Cheung et al. | |
| 10,242,477 B1 | 3/2019 | Charlton et al. | |
| 10,242,503 B2 | 3/2019 | McPhee et al. | |
| 10,254,956 B2 | 4/2019 | Chaudhri et al. | |
| 10,262,250 B1 | 4/2019 | Spiegel et al. | |
| 10,361,986 B2 | 7/2019 | Crocker et al. | |
| 10,362,219 B2 | 7/2019 | Wilson et al. | |
| 10,382,382 B2 | 8/2019 | Chae et al. | |
| 10,389,661 B2 | 8/2019 | Odell et al. | |
| 10,437,551 B1 | 10/2019 | Stanek et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,582,157 B1 | 3/2020 | Cushing et al. | |
| 10,657,701 B2 | 5/2020 | Osman et al. | |
| 10,778,623 B1 | 9/2020 | Wu et al. | |
| 10,913,004 B1 * | 2/2021 | Wu ........................ | A63F 13/48 |
| 11,052,322 B1 | 7/2021 | Wu et al. | |
| 11,103,795 B1 | 8/2021 | Wu et al. | |
| 11,122,094 B2 | 9/2021 | Eirinberg et al. | |
| 11,356,392 B2 | 6/2022 | Desserrey et al. | |

(56) References Cited

U.S. PATENT DOCUMENTS

| | | | |
|---|---|---|---|
| 11,491,406 B2 | 11/2022 | Wu et al. | |
| 2002/0067362 A1 | 6/2002 | Agostino Nocera et al. | |
| 2002/0169644 A1 | 11/2002 | Greene | |
| 2004/0013254 A1 | 1/2004 | Hamberg et al. | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0038701 A1 | 2/2007 | Majors et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2007/0198637 A1 | 8/2007 | Deboy et al. | |
| 2008/0104379 A1 | 5/2008 | Peterman et al. | |
| 2008/0158222 A1 | 7/2008 | Li et al. | |
| 2009/0016617 A1 | 1/2009 | Bregman-Amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0164936 A1 | 6/2009 | Kawaguchi | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0131866 A1 | 5/2010 | Nielsen et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2010/0251142 A1* | 9/2010 | Geppert | H04W 4/21 715/758 |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0184886 A1* | 7/2011 | Shoham | G06Q 30/0283 705/400 |
| 2011/0239136 A1 | 9/2011 | Goldman et al. | |
| 2011/0302509 A1* | 12/2011 | Leacock | H04L 65/403 715/756 |
| 2011/0319175 A1* | 12/2011 | Jensen | A63F 13/533 463/42 |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2012/0311504 A1* | 12/2012 | van Os | G06F 3/0482 715/853 |
| 2013/0103760 A1 | 4/2013 | Golding et al. | |
| 2013/0179518 A1 | 7/2013 | Quan | |
| 2013/0201187 A1 | 8/2013 | Tong et al. | |
| 2013/0218987 A1* | 8/2013 | Chudge | H04L 51/043 709/206 |
| 2013/0249948 A1 | 9/2013 | Reitan | |
| 2013/0257877 A1 | 10/2013 | Davis | |
| 2014/0026198 A1 | 1/2014 | Isozaki et al. | |
| 2014/0043329 A1 | 2/2014 | Wang et al. | |
| 2014/0055554 A1 | 2/2014 | Du et al. | |
| 2014/0068467 A1* | 3/2014 | Van | H04L 51/58 715/758 |
| 2014/0125678 A1 | 5/2014 | Wang et al. | |
| 2014/0129343 A1 | 5/2014 | Finster et al. | |
| 2014/0274354 A1* | 9/2014 | George | G06Q 30/0631 463/29 |
| 2014/0279121 A1* | 9/2014 | George | G06Q 30/0283 705/26.1 |
| 2014/0029821 A1 | 10/2014 | Park et al. | |
| 2014/0298210 A1* | 10/2014 | Park | G06F 3/0487 715/758 |
| 2015/0012842 A1* | 1/2015 | Kusch | H04L 65/403 715/753 |
| 2015/0032686 A1* | 1/2015 | Kuchoor | H04L 51/04 707/608 |
| 2015/0033140 A1 | 1/2015 | Kuchoor | |
| 2015/0033148 A1 | 1/2015 | Kuchoor | |
| 2015/0033149 A1 | 1/2015 | Kuchoor | |
| 2015/0038235 A1* | 2/2015 | Kamekawa | A63F 13/88 463/42 |
| 2015/0163258 A1 | 6/2015 | Garcia, III et al. | |
| 2015/0195220 A1* | 7/2015 | Hawker | H04L 51/216 707/723 |
| 2015/0206349 A1 | 7/2015 | Rosenthal et al. | |
| 2016/0011845 A1 | 1/2016 | Kuchoor | |
| 2016/0092035 A1* | 3/2016 | Crocker | H04L 51/52 715/752 |
| 2016/0117665 A1 | 4/2016 | Davis | |
| 2016/0134840 A1 | 5/2016 | Mcculloch | |
| 2016/0234149 A1 | 8/2016 | Tsuda et al. | |
| 2016/0236097 A1 | 8/2016 | Sullivan et al. | |
| 2017/0046024 A1 | 2/2017 | Dascola et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0148055 A1 | 5/2017 | Boothroyd et al. | |
| 2017/0199855 A1 | 7/2017 | Fishbeck | |
| 2017/0235848 A1 | 8/2017 | Van et al. | |
| 2017/0266569 A1 | 9/2017 | Sullivan et al. | |
| 2017/0279859 A1* | 9/2017 | Pogorelik | G06F 3/04817 |
| 2017/0291111 A1 | 10/2017 | Chandrasekaran et al. | |
| 2017/0310934 A1 | 10/2017 | Du et al. | |
| 2017/0312634 A1 | 11/2017 | Ledoux et al. | |
| 2017/0357443 A1* | 12/2017 | Paek | G06F 3/0482 |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0193753 A1* | 7/2018 | Kiwada | A63F 13/795 |
| 2018/0221774 A1 | 8/2018 | Sullivan et al. | |
| 2018/0227534 A1 | 8/2018 | Zhou et al. | |
| 2018/0241871 A1 | 8/2018 | Sarafa et al. | |
| 2018/0296928 A1 | 10/2018 | Vaccari et al. | |
| 2018/0309801 A1* | 10/2018 | Rathod | H04M 3/5175 |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2018/0329622 A1 | 11/2018 | Missig et al. | |
| 2018/0331839 A1* | 11/2018 | Gao | G06Q 10/107 |
| 2018/0367483 A1* | 12/2018 | Rodriguez | H04L 51/046 |
| 2019/0001223 A1 | 1/2019 | Blackstock et al. | |
| 2019/0036989 A1 | 1/2019 | Eirinberg et al. | |
| 2019/0057616 A1 | 2/2019 | Cohen et al. | |
| 2019/0104216 A1 | 4/2019 | Van Hecke et al. | |
| 2019/0188920 A1 | 6/2019 | Mcphee et al. | |
| 2019/0272064 A1* | 9/2019 | Ghassabian | G06F 3/011 |
| 2019/0314728 A1 | 10/2019 | Sullivan et al. | |
| 2020/0293184 A1* | 9/2020 | Makovsky | G06F 9/451 |
| 2020/0379617 A1* | 12/2020 | Chang | H04M 1/72433 |
| 2020/0380003 A1* | 12/2020 | Abbasi Moghaddam | H04M 1/27475 |
| 2021/0044559 A1* | 2/2021 | Jain | H04L 51/216 |
| 2021/0069601 A1* | 3/2021 | Wu | A63F 13/352 |
| 2021/0149553 A1* | 5/2021 | Lereya | G06F 16/248 |
| 2021/0342785 A1* | 11/2021 | Mann | G06Q 10/0633 |
| 2021/0392096 A1 | 12/2021 | Desserrey et al. | |
| 2022/0070233 A1 | 3/2022 | Eirinberg et al. | |

FOREIGN PATENT DOCUMENTS

| | | |
|---|---|---|
| CN | 103649985 A | 3/2014 |
| CN | 109863532 | 6/2019 |
| CN | 110168478 | 8/2019 |
| CN | 110945858 A | 3/2020 |
| CN | 110945858 | 6/2022 |
| EP | 2184092 | 5/2010 |
| EP | 2475137 A2 | 7/2012 |
| JP | 2001230801 | 8/2001 |
| JP | 5497931 | 3/2014 |
| KR | 20130050871 A | 5/2013 |
| KR | 101445263 | 9/2014 |

(56) References Cited

FOREIGN PATENT DOCUMENTS

| | | |
|---|---|---|
| KR | 101521332 B1 | 5/2015 |
| KR | 20160075457 A | 6/2016 |
| KR | 20170068379 A | 6/2017 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | WO-2019023596 A1 | 1/2019 |
| WO | WO-2019023596 A8 | 1/2019 |
| WO | 2019089613 | 5/2019 |

OTHER PUBLICATIONS

U.S. Appl. No. 17/473,222, filed Sep. 13, 2021, Software Application Manager for Messaging Applications.

U.S. Appl. No. 16/177,320 U.S. Pat. No. 11,103,795, filed Oct. 31, 2018, Game Drawer.

U.S. Appl. No. 16/949,917, filed Nov. 20, 2020, Game Drawer.

U.S. Appl. No. 16/948,429, filed Sep. 17, 2020, Messaging System Including an External-Resource Dock and Drawer.

"U.S. Appl. No. 16/948,429, 312 Amendment filed Apr. 25, 2022", 3 pgs.

"U.S. Appl. No. 16/948,429, Corrected Notice of Allowability dated Feb. 23, 2022", 2 pgs.

"U.S. Appl. No. 16/948,429, Non Final Office Action dated Sep. 16, 2021", 14 pgs.

"U.S. Appl. No. 16/948,429, Notice of Allowance dated Feb. 1, 2022", 7 pgs.

"U.S. Appl. No. 16/948,429, Response filed Dec. 16, 2021 to Non Final Office Action dated Sep. 16, 2021", 10 pgs.

"Chinese Application Serial No. 201880049601.8, Office Action dated Nov. 3, 2021", w/English translation, 12 pgs.

"International Application Serial No. PCT/US2021/035094, International Search Report dated Sep. 17, 2021", 3 pgs.

"International Application Serial No. PCT/US2021/035094, Written Opinion dated Sep. 17, 2021", 4 pgs.

Babyjohanna, "How to quickly enter the game that a friend is playing", [Online] Retreived from the Internet: <URL: https://jingyan.baidu.com/article/eb9f7b6d9e21dl869364e806.html>, (Oct. 30, 2014), 4 pgs.

"U.S. Appl. No. 17/473,222, Response filed Aug. 5, 22 to Non Final Office Action dated Apr. 5, 2022", 10 pgs.

"U.S. Appl. No. 17/473,222, Final Office Action dated Oct. 11, 2022", 9 pgs.

"U.S. Appl. No. 16/949,917, Notice of Allowability dated Oct. 13, 2022", 2 pgs.

"U.S. Appl. No. 17/473,222, Response filed Dec. 5, 22 to Final Office Action dated Oct. 11, 2022", 3 pgs.

"International Application Serial No. PCT US2021 035094, International Preliminary Report on Patentability dated Dec. 22, 2022", 6 pgs.

"U.S. Appl. No. 17/473,222, Notice of Allowance dated Jan. 12, 2023", 13 pgs.

\* cited by examiner

| A | B | C | D | E | F | G |
|---|---|---|---|---|---|---|
| | 1 app (inactive) | 1 app (active) | 2 apps (inactive) | 2 apps (at least 1 active) | 3+ apps (inactive) | 3+ apps (at least 1 active) |
| 2. Tap on dock | Opens app | Opens app | Opens drawer | Opens drawer | Opens drawer | Opens drawer |
| 3. Press-and-hold | Drag to hide active | - | - | - | - | - |
| 4. Chat dock UI affordance | None | # of active members | None | Blue dot | None | Blue dot |
| 5. Can hide from dock? | Yes | No | No | No | No | No |
| 6. Can hide from drawer: | Via 'X' | No | Via 'X' | No | Via 'X' | No |

FIG. 7

MESSAGING SYSTEM INCLUDING AN EXTERNAL-RESOURCE DOCK AND DRAWER

CROSS-REFERENCE TO RELATED APPLICATIONS

This application is a continuation of U.S. patent application Ser. No. 16/948,429, filed on Sep. 17, 2020, which claims the benefit of U.S. Provisional Patent Application No. 63/037,460, filed on Jun. 10, 2020, the contents of which are incorporated by reference herein as if specifically set forth.

BACKGROUND

The popularity of users interacting with other users on messaging and social networking applications continues to grow. As these applications have continued to become more sophisticated, the ways in which users can interact has grown significantly. For example, users can both communicate with their friends using messaging applications and can play with friends and other users online in multiplayer games. However, there remains a disconnect between the people the user communicates with using the messaging applications and the people the user plays with in the multiplayer games. For example, users may have to leave a game a user is playing to send messages to tell their friends through the messaging application that they are playing a game, and the user may have to leave a conversation the user is having to join a friend in playing a game.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 7 illustrates a table for use in example implementations of the user interfaces disclosed herein.

DETAILED DESCRIPTION

Figure 1:
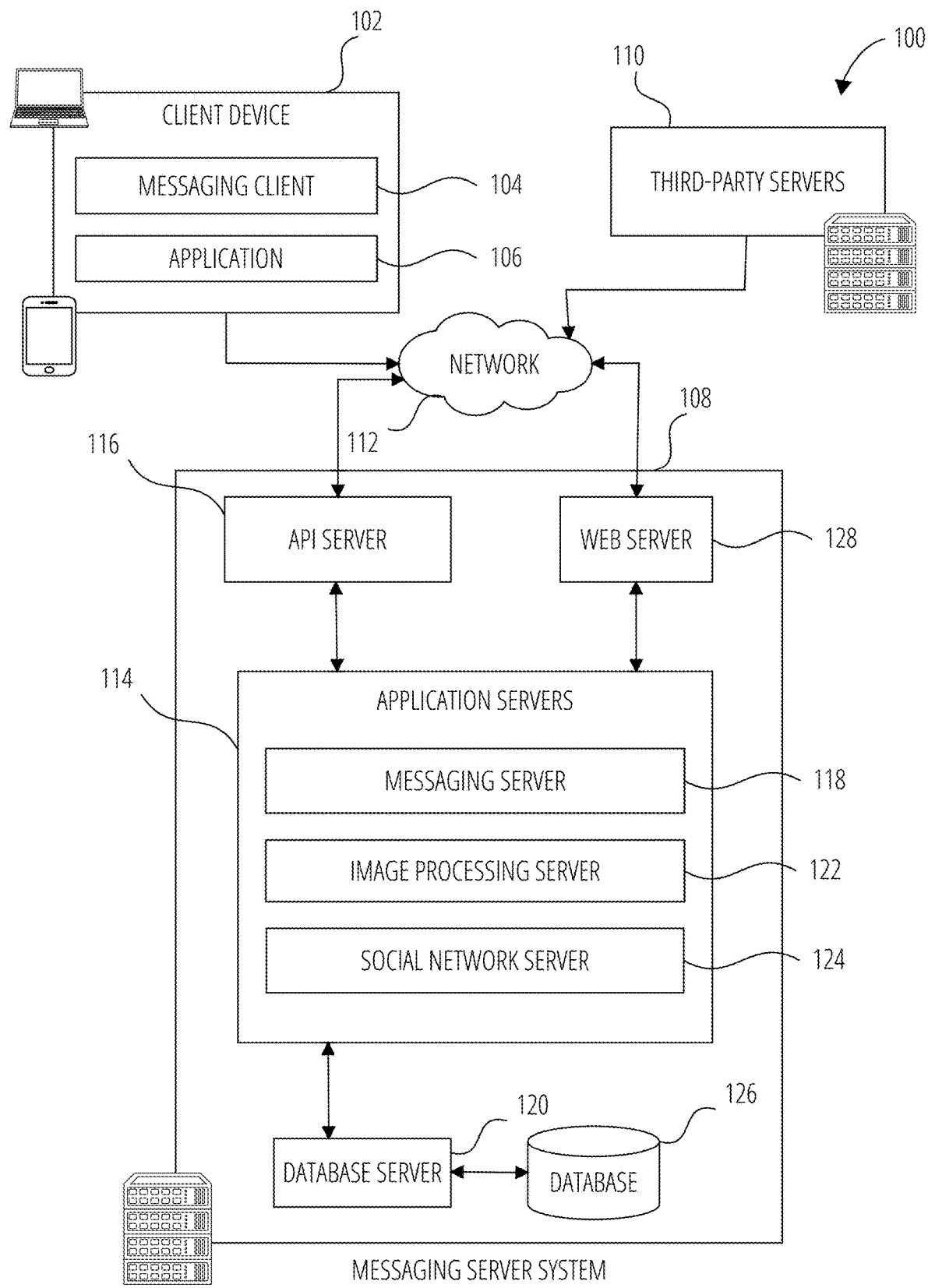
FIG. 1 is a diagrammatic representation of a networked environment in which the present disclosure may be deployed, in accordance with some examples.

As messaging applications have become more sophisticated, in addition to using the messaging application to chat with their friends, messaging applications are supporting more and more additional functions. For example, the user of a messaging application may play any one of a number of solo or multiplayer games that are integrated with the messaging application. Additional functionality may be provided by having the messaging application present a user interface for another application installed on the client device (e.g., a "native application"), or a small-scale version of the application (e.g., an "applet"), that is hosted on the client device or remotely on third-party servers. Such external resources may for example be slimmed down versions of other, existing applications, such as a food ordering or music streaming application or a game. Alternatively, the external resource could be a native application and the messaging application could present a slimmed-down version of the user interface off the native application. By providing a user interface corresponding to an applet or another application within the messaging application, the user of the messaging application can access at least some of the functionality corresponding to the existing "full size" application without leaving the messaging application.

The applets may also provide other functionality, and both the applets and applications that are available for access via the user interface of the messaging application may have been provided by the provider of the messaging application or they may have been provided by third parties. Third parties in this instance being third parties with respect to the provider of the messaging application.

As the scope of activities that can be performed on the messaging application has increased, including interacting with applets and applications via the user interface of the messaging application, it may be beneficial to notify friends of the user, and for the user be notified by their friends, of activity taking place in such applets and applications. The disclosed embodiments improve the functionality of messaging application software and systems by providing participants in a conversation in the messaging application with notifications relating to the current or recent use of an external resource (e.g. an applet or application) by one or more members of a group of friends. Also disclosed is a seamless way to join one or more friends in an active external resource or to launch a recently-used but currently inactive (in the group of friends) external resource. The disclosed embodiments improve the functionality of messaging application software and systems by providing a unique user interface for users to select an external resource from a list of two or more currently active or recently used external resources.

Specifically, the disclosed embodiments provide an improved GUI that enables users to quickly access an active external resource with the same friends they are chatting with. Also, discovery of shared interests within a group is facilitated by providing a GUI in which recently used external resources across the group are conveniently shown in a chat interface.

The disclosed embodiments streamline the process for the user to join an external resource with friends by displaying a UI format including list of external resources on the device being used by a user and allowing the user to select and launch an external resource from the list within the same GUI the user is using to chat to their friends. Once the external resource is launched within the context of the messaging program, all of the friends the user is having the conversation with are able to quickly join the user in the external resource, which avoids forcing the user to search for and individually invite friends to play as in many conventional systems. This improves the user experience, reduces the amount of whitespace on the screen, reduces the number of steps a user has to perform to select and access an external resource. For example, the disclosed embodiments reduce the number of screens a user has to navigate through to access, launch or reach a given an external resource.

In one example, disclosed is a method of providing a conversation interface in a messaging application on a computing device, the conversation interface being presented to participants in a conversation that is being conducted on the messaging application. The method comprises determining statuses of at least two external resources that have been accessed from within a context of the messaging application, by one or more of the participants; displaying an external resource notification interface in the conversation interface, the external resource notification interface including icons corresponding to the at least two external resources; receiving a user selection of the external resource notification interface; and displaying a list interface including user-selectable cells corresponding to the at least two external resources.

The user-selectable cells in the list interface may be ordered first by currently active external resources and then by recently active external resources. The conversation interface may comprise a text input region, a presence region above the text input region that shows visual identifiers corresponding to participants in a group conversation, and the external resource notification interface may be located adjacent to or overlapping the presence region.

The method may further comprise receiving user selection of a particular external resource by a particular participant; accessing the particular external resource for the particular participant; and updating the external resource notification interface and the list interface for other participants according to a newly-active status of the particular external resource. A user-selectable cell in the list interface corresponding to the particular external resource may be updated to include a name of the particular participant.

A user-selectable cell in the list interface corresponding to the particular external resource may include a call to action button for other participants in the conversation that are not active in the particular external resource, to join the particular external resource.

The method may further comprise updating the external resource notification interface by displaying an icon corresponding to the particular external resource in a first location in the external resource notification interface. The method may still further comprise updating the external resource notification interface with a status indicator to indicate that at least one of the external resources corresponding to the icons in the external resource notification interface is active for at least one participant in the conversation. The method may yet further comprise receiving a user input to dismiss a selected inactive external resource from the list interface, and removing a user-selectable cell corresponding to the selected inactive external resource from the list interface.

Also provided is a system comprising one or more processors of a machine, a camera, a display, and a memory storing instructions for providing a conversation interface in a messaging application. The conversation interface is presented to participants in a conversation that is being conducted on the messaging application. The instructions when executed by at least one processor, causes the machine to perform operations comprising: determining statuses of at least two external resources that have been accessed from within a context of the messaging application, by one or more of the participants; displaying an external resource notification interface in the conversation interface, the external resource notification interface including icons corresponding to the at least two external resources; receiving a user selection of the external resource notification interface; and displaying a list interface including user-selectable cells corresponding to the at least two external resources.

The system operations may further comprise receiving user selection of a particular external resource by a particular participant, accessing the particular external resource for the particular participant, and updating the external resource notification interface and the list interface for other participants according to a newly-active status of the particular external resource. A user-selectable cell in the list interface corresponding to the particular external resource may be updated to include a name of the particular participant. A user-selectable cell in the list interface corresponding to the particular external resource may be selectable by other participants in the conversation that are not active in the particular external resource, to join the particular external resource.

The system operation may further comprise updating the external resource notification interface with a status notification to indicate that at least one of the external resources corresponding to the icons in the external resource notification interface is active for at least one participant in the conversation. Still further, the operations may comprise receiving a user input to dismiss a selected inactive external resource from the list interface, and removing a user-selectable cell corresponding to the selected inactive external resource from the list interface.

Also provided is a non-transitory machine-readable storage medium embodying instructions for providing a conversation interface in a messaging application, the conversation interface being presented to participants in a conversation that is being conducted on the messaging application. The instructions, when executed by a device including a display, cause the device to perform operations comprising determining statuses of at least two external resources that have been accessed from within a context of the messaging application, by one or more of the participants; displaying an external resource notification interface in the conversation interface, the external resource notification interface including icons corresponding to the at least two external resources; receiving a user selection of the external resource notification interface; and displaying a list interface including user-selectable cells corresponding to the at least two external resources.

The conversation interface defined by the instructions may comprise a text input region, a presence region above the text input region that shows visual identifiers corresponding to participants in a group conversation, and the external resource notification interface may be located adjacent to or overlapping the presence region. The operations may further comprise receiving user selection of a particular external resource by a particular participant, accessing the particular external resource for the particular participant, and updating the external resource notification interface and the list interface for other participants according to a newly-active status of the particular external resource.

The instructions may define operations further comprising updating the external resource notification interface by displaying an icon corresponding to the particular external resource in a first location in the external resource notification interface. The operations may further comprise updating the external resource notification interface with a status notification to indicate that at least one of the external resources corresponding to the icons in the external resource notification interface is active for at least one participant in a conversation.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
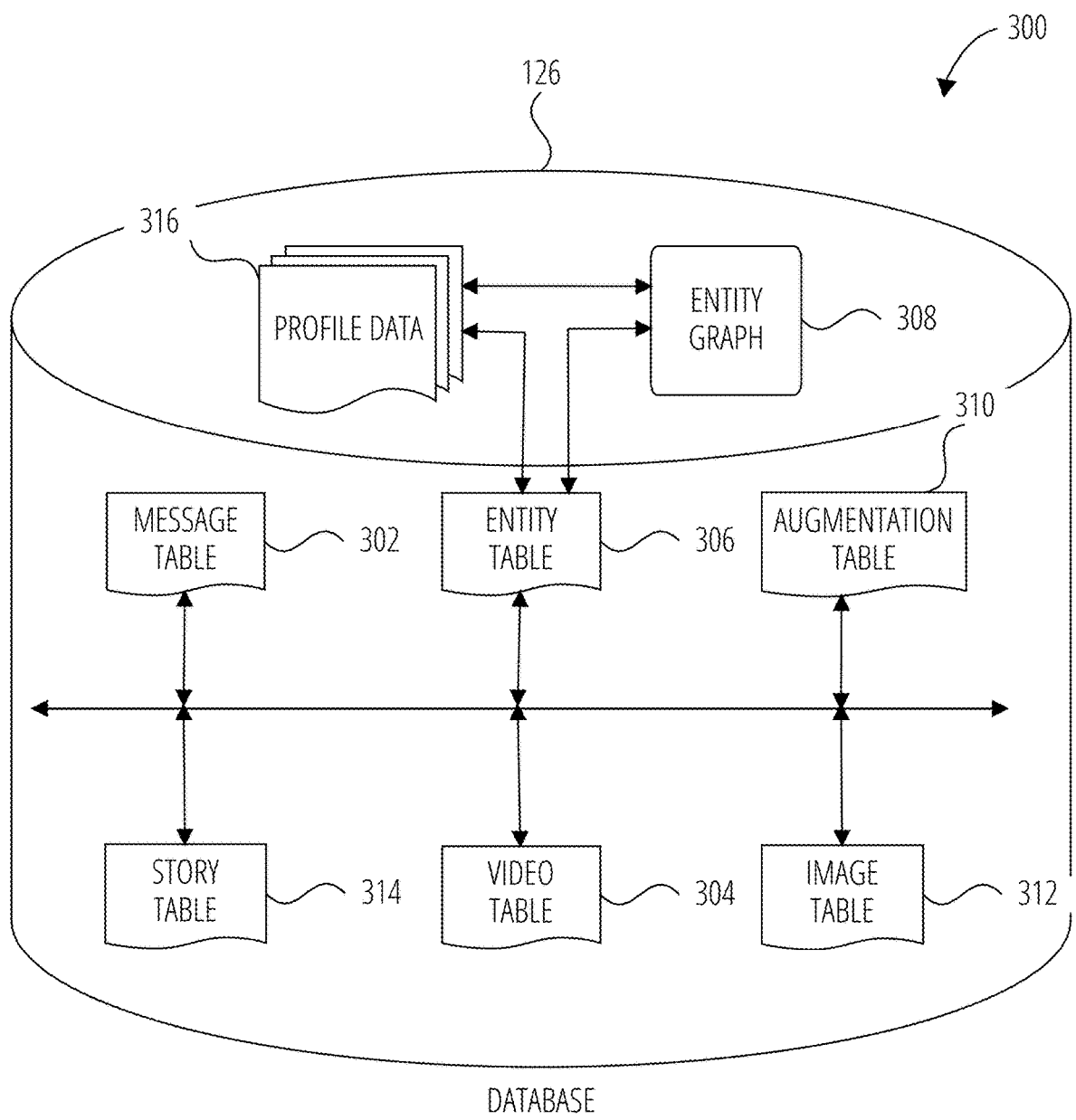
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource, when accessed can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
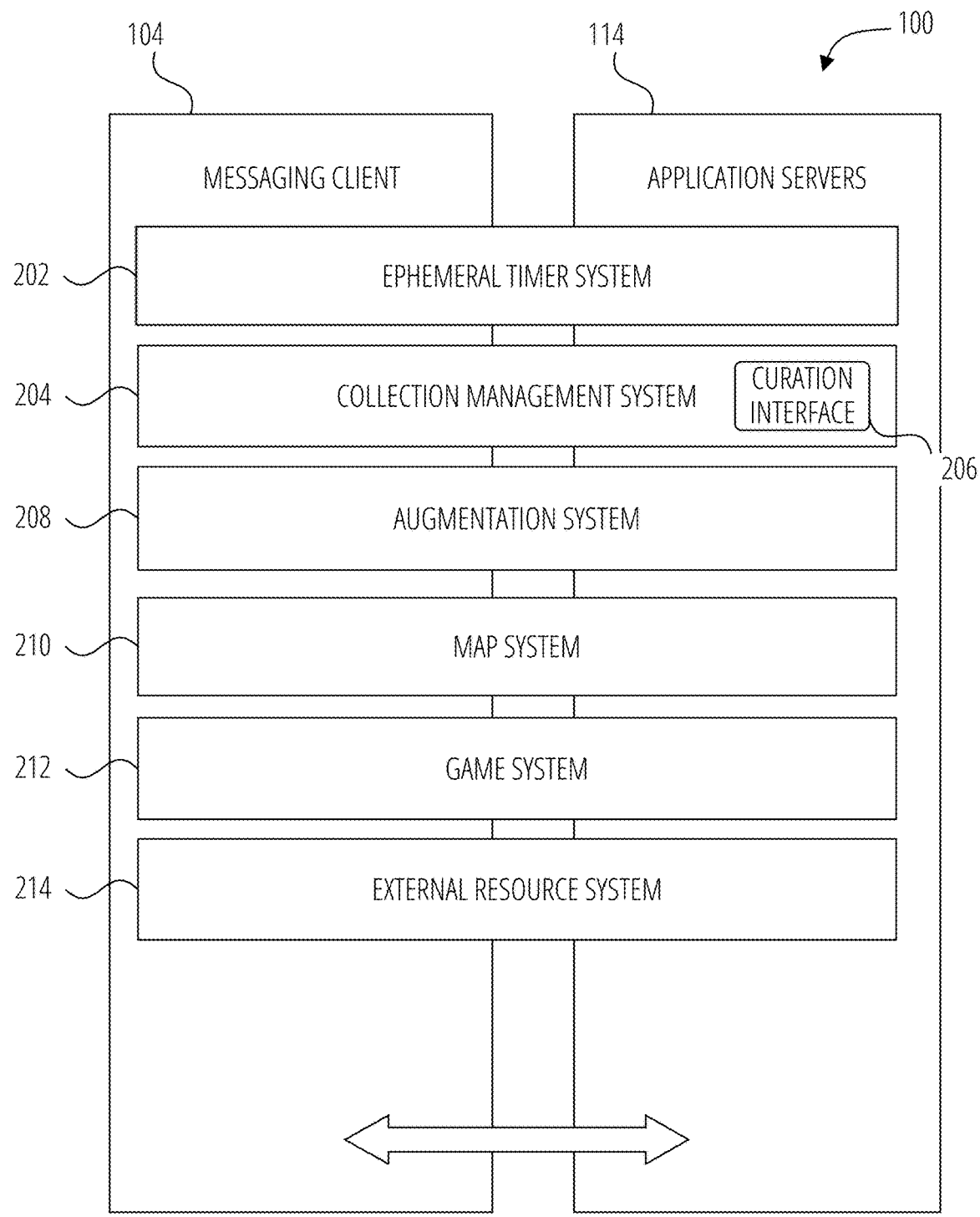
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, and an external resource system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104.

The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

In addition to providing the methods and interfaces described in more detail below, the messaging client 104 provides an interface providing a list of available external resources that can be launched by a user within the context of the messaging client 104, and played or used concurrently with other users of the messaging system 100. The messaging system 100 further enables a particular user to invite other users to participate in a particular external resource, by issuing invitations to such other users from the messaging client 104. The messaging client 104 also supports both the voice and text messaging (e.g., chats) within the context of gameplay or other concurrent external resource usage, including for example providing a leaderboard for the games, in-game rewards (e.g., coins and items) etc.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
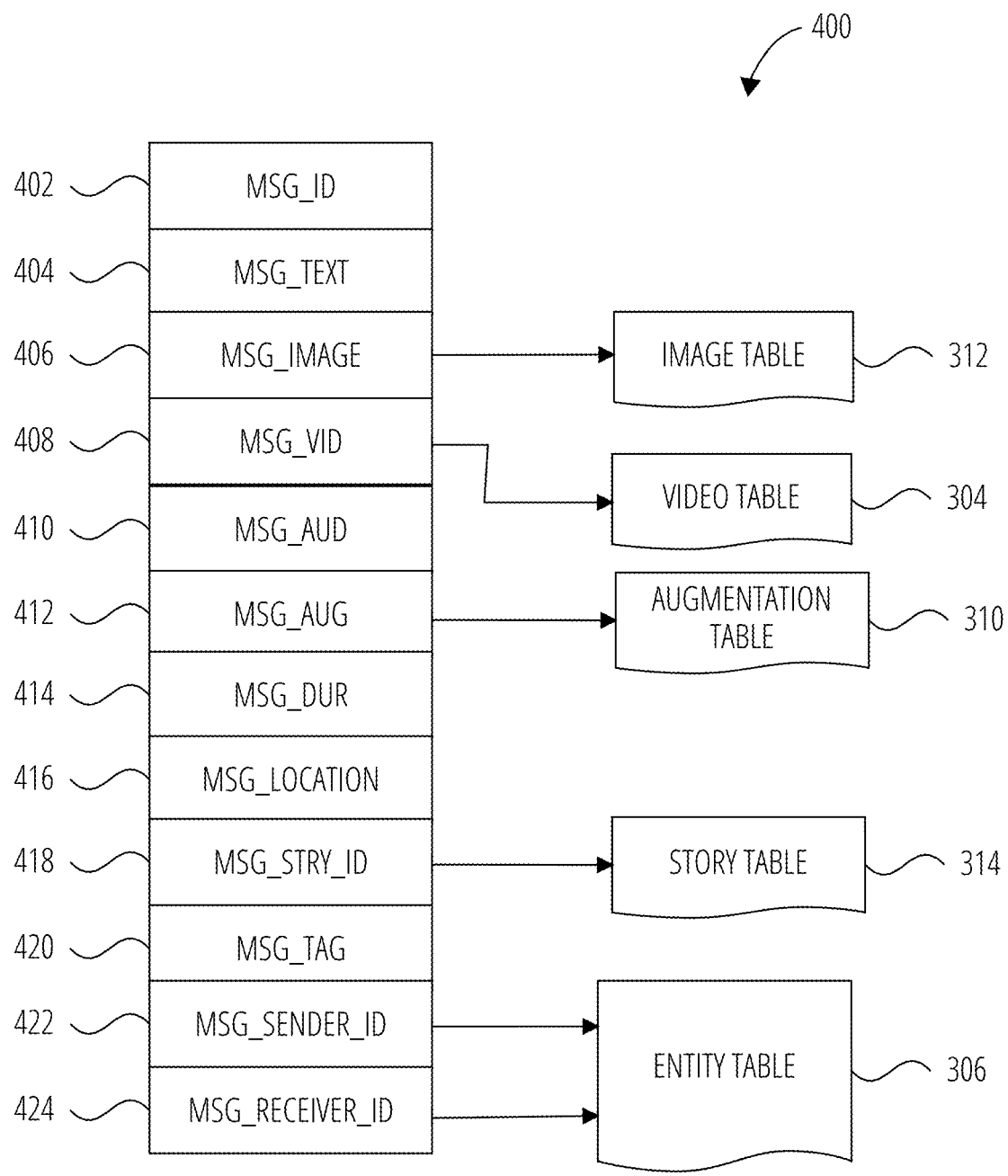
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 5:
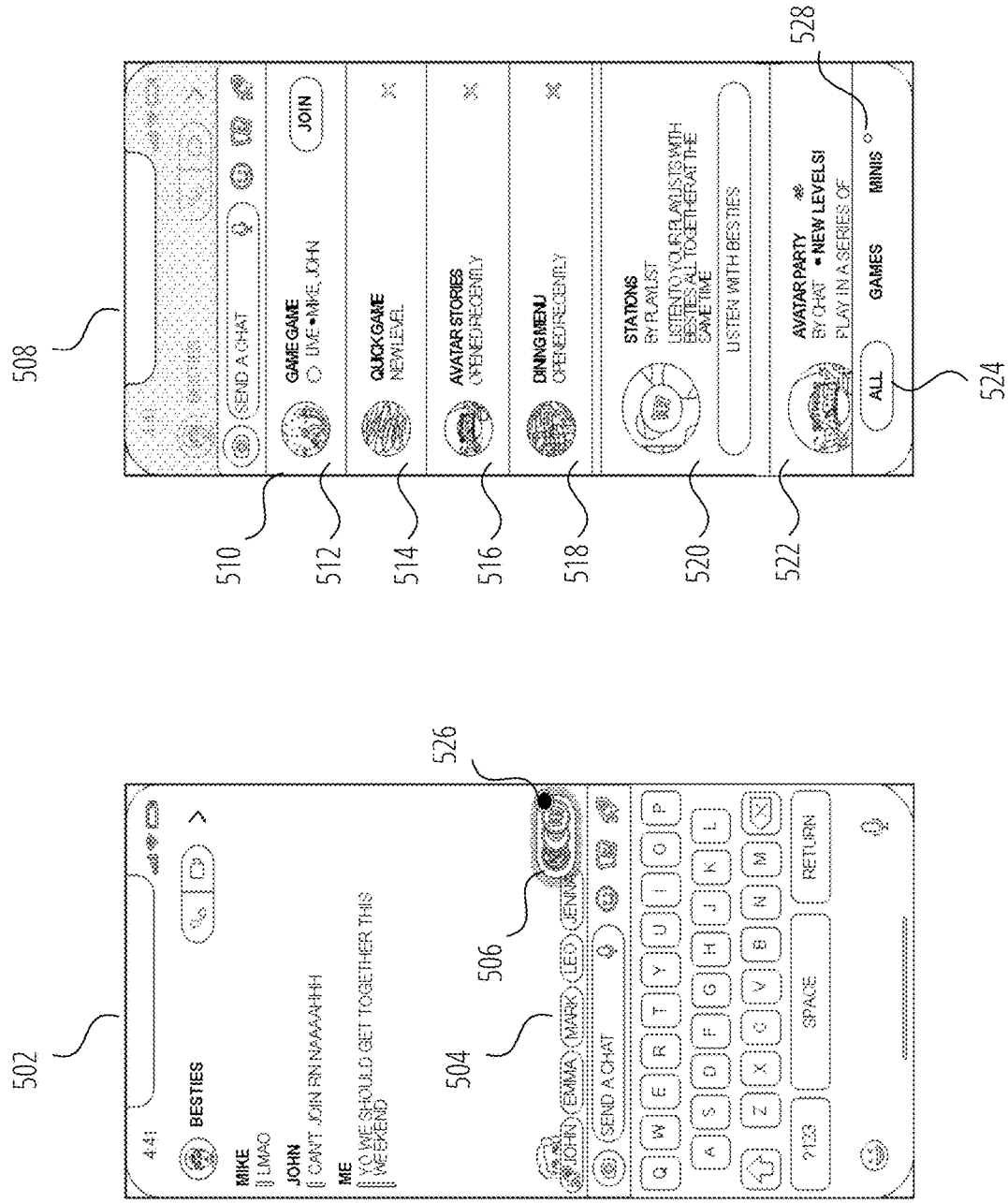
FIG. 5 shows illustrative user interfaces of the messaging application according to some examples.

FIG. 5 shows illustrative user interfaces of the messaging application presented to a user of a client device on a display of the device, according to some embodiments. For example, the user interfaces of the messaging application shown in FIG. 5 represent a conversation interface 502 between five participants that are part of a group named "Besties." Conversation interface 502 includes a presence region 504 that presents visual identifiers of participants in the group conversation. The visual identifiers in presence region 504 may include an avatar associated with each active participant and a name of each participant. Underneath (or adjacent to) the presence region 504 the messaging application presents a plurality of conversation options and a keyboard. The conversation options include a textual entry box in which a participant can type a message using the keyboard and the message when sent is presented as a chat bubble above the presence region 504. Other conversation options include a camera option allowing a user to take a picture or video for submission to the conversation interface as a message in a chat bubble, and a rocket icon for accessing games.

Conversation interface 502 also includes an external resource notification interface, shown in the figure as dock 506, comprising two or more external resource icons that are either active for a member of the conversation or have recently been used by one or more members of the conversation. The time period in which an external resource is eligible for inclusion in the dock 506 is a matter of design preference, but in one example may be 80 hours. The dock 506 is a shared UI component within a conversation. All members of a conversation can see the same set of icons in the dock 506 concurrently, if they are viewing the messaging client 104 in their version of conversation interface 502. As can be seen from the figure, the dock 506 is located adjacent to or overlapping the presence region 504 in this example.

Included with the dock 506 is a status indicator 526, which indicates whether one or more of the external resources shown in the dock 506 are active. In one example, the status indicator 526 is a circle of a particular color, e.g. blue, that may be present to indicate a condition of an external resource that may be of interest, and absent when no such condition exists. For example, the condition under which the status indicator 526 is present might be an active status of one or more external resources in the dock 506, an update to (or new features or levels available in) an external resource currently in the dock 506 or drawer 510, or an interaction with the particular external resource in some other manner by a member of the conversation, or activation by a friend who is not a conversation participant.

Messaging client 104 retrieves, monitors or is provided with metadata (or updated metadata) for each external resource that is included in the dock 506. In the event that there is a change in the metadata that might require an update to the status indicator 526, the messaging client 104 compares the updated metadata to the existing metadata and a set of conditions to determine if the status indicator 526 needs to be updated. For example, there may be a priority of status items (e.g. a conversation participant being active in an external resource may be more important than a previously-taken but noteworthy action in an external resource, which may be more important than an update to or new levels in an external resource). Furthermore, this priority may vary with time, for example a new level or update may override a relatively stale previously-taken but noteworthy action in an external resource.

Alternatively, or in addition, other visual indicators may be used, depending on the state of the dock 506. For example, if there is only one, currently-active external resource shown in dock 506, the status indicator 526 may include a number indicating how many members of the conversation are participating in the active external resource in place of the illustrated status indicator 526. In another example, a visual indication may be provided solely to indicate that one or more of the external resources are active. For example, the dock 506 may be surrounded by a colored or "rainbow" shadow 608 (see FIG. 6) when there is an active external resource in the dock 506. This provides a more specific indication of an external resource being active than the status indicator 526, which may be shown if there are conditions other than external resource active status as discussed above. The dock 506 is shown in more detail in FIG. 6.

Tapping on the dock 506 results in the display of conversation interface 508, in which the messaging application replaces the display of the keyboard and chat window shown in conversation interface 502 with a drawer 510 in the form of a list interface including user-selectable cells corresponding to at least two external resources. In the example shown, the drawer 510 comprises an active cell 512 and a number of inactive cells 514, 516 and 518. In this regard, active and inactive refers to the current status of the external resource that is represented by the cell within the group comprising the conversation participants. All of the cells themselves in conversation interface 508 are "active" in the sense that user interaction with each cell is possible. Active and inactive cells are shown in more detail in FIG. 6.

The cells in the drawer 510 are ordered from top to bottom based on how long ago they were accessed, with active cells always being ranked above inactive cells. If there is more than one active cell, the active cells may be shown in order from top to bottom based on a number of factors, for example how recently the corresponding external resource was activated or had a new participant join, the number of participants in the conversation who are engaged in the external resource, or the overall number of users in the conversation who are engaged in the external resource. Additionally, the position of an active or inactive cell may be promoted to a higher position in the group of active or inactive cells based on it being a new addition or on payment by the developer of the external resource. Finally, if there is new or updated content for an external resource, this might be used to advance it to the top of its group (e.g. in the active group of cells for active external resources or in the inactive group of cells for inactive external resources,)

It is to be noted that the number of icons in the dock 506 is not necessarily the same as the number of cells in the drawer 510. In one implementation, the number of icons in the dock 506 is a maximum of three, while the number of cells in the drawer 510 may be as many as can comfortably be accommodated given the parameters of the client device 102 and additional design consideration such as a desire to present additional or alternative information. If an icon is shown in the dock 506 then its cell will be ranked higher in the drawer 510 than an external resource that has not been assigned to the dock 506. That is, the top three cells in the drawer 510 may correspond to the three icons in the dock 506.

Also shown in drawer 510 is cell 520, which may for example be a promoted item, and cell 522, which may for example be a special event or a newsworthy update to a game (e.g. new levels available) or other external resource. Cell 520 and cell 522 in the illustrated embodiment do not meet the recency requirements for inclusion in the drawer 510 as such, but may be included to fill space under the drawer based on one or more other parameters.

Messaging client 104 retrieves, monitors, or is provided with metadata (or updated metadata) for each external resource that is included in the dock 506 and the drawer 510, as well as for user or other related activity, e.g. the accessing of an external resource not in the dock or drawer by a conversation participant, the promotion of an external resource or event, etc. In the event that there is a change in the metadata that might require an update to the dock 506 or drawer 510, or to the appearance of an icon or cell, the messaging client 104 compares the updated metadata to the existing metadata to determine if the drawer 510 or dock 506 need to be updated. If so, the messaging client 104 then makes an appropriate update to the drawer 510 or dock 506 as discussed in more detail herein, e.g. by adding/removing an icon or cell, reordering the icons or cells, etc.

Also included is a filter cell 524 with user-selectable options of setting the view in drawer 510 to "All" items or "Games" only or "Minis" (i.e. non-game applets) only. Selection of "Games" or "Minis" limits the items displayed in the drawer 510 to the selected category. An indicator 528 (e.g. a blue dot above and to the right of "Minis") may also be provided to signal a status in that category that might be of interest to the user, for example an updated external resource, an active external resource, etc.

In response to receiving a user selection of one of the cells from cell 512 to cell 522, the messaging application retrieves the HTML5 file (or other code) of the external resource associated with the selected cell and instantiates various resources to launch or access the corresponding external resource. The particular behavior of the messaging application will then be determined by the particular external resource that has been launched. The status of the external resource in the dock 506 and drawer 510 in instances of these items being presented to conversation participants will be updated to reflect the new status of the external resource as being active.

The drawer 510 is the same no matter which participant in the conversation it is being presented to. Namely, one user's interactions with the drawer 510 affects the way another user in the same conversation sees the drawer 510.

Figure 6:
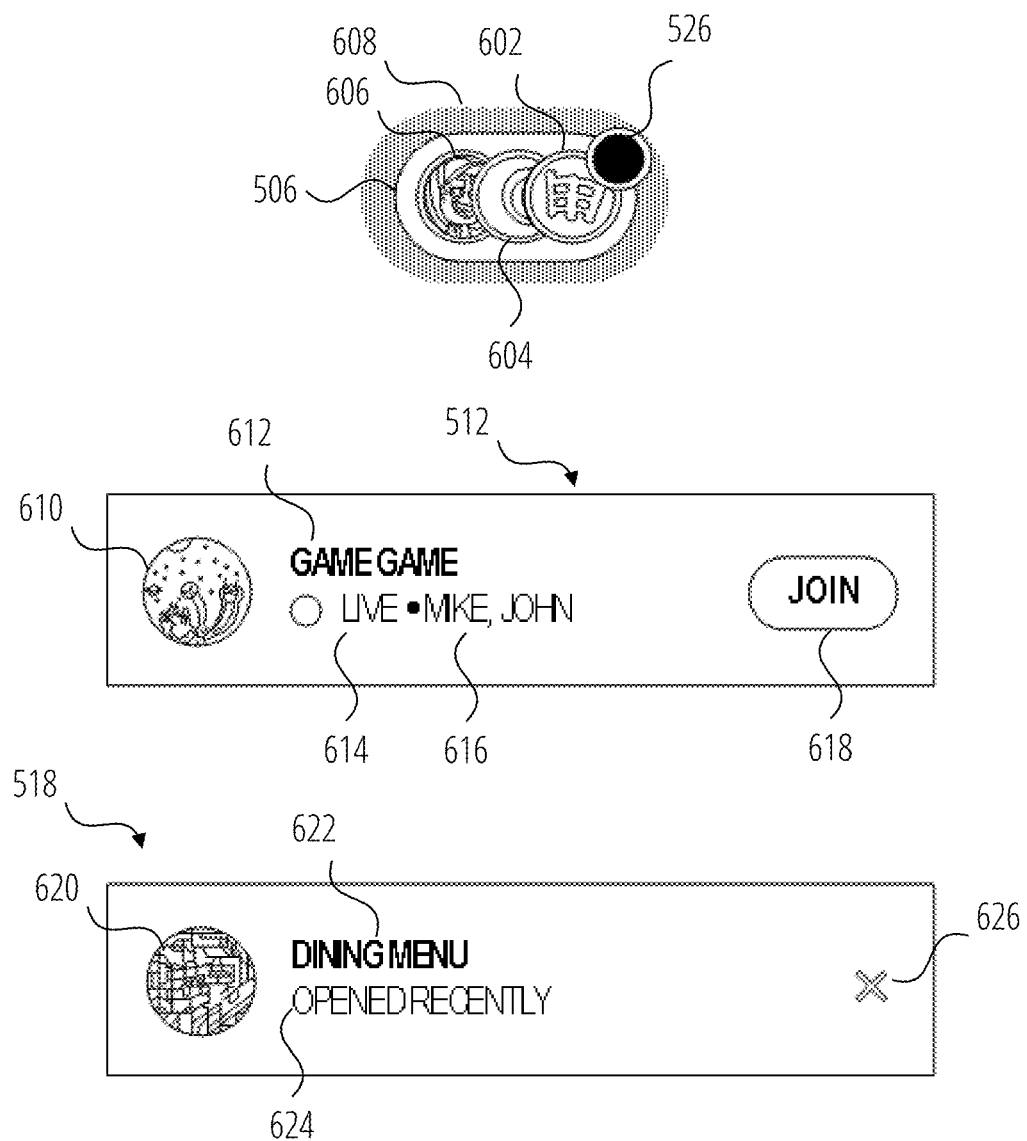
FIG. 6 shows the dock, an active cell and an inactive cell from one of the user interfaces shown in FIG. 5.

FIG. 6 shows the dock 506, active cell 512 and inactive cell 518 in more detail. As can be seen, the dock includes icons 602, 604 and 606, status indicator 526 and shadow 608. As discussed above, the presence of shadow 608 indicates that one or more of the external resources corresponding to icons 602, 604 or 606 are active, while the presence of status indicator 526 in its "active" view also shows this active status, but will also be shown if there are additional conditions relating to items in the drawer 510 as discussed above. In the example shown, the dock 506 shows a minimum of one icon and a maximum of three icons, but of course this may vary depending on design choice.

The icons in dock 506 are sorted from right to left based on how recently the corresponding external resource was accessed, with the most-recently accessed being shown on the right in this example. If an external resource in the dock 506 times out without being accessed again, it will drop off the dock 506 and the size of the dock 506 will shrink to a smaller size or its place will be taken by a fourth external resource (if any) currently in the drawer 510, provided that the fourth external resource meets the requirements for inclusion in the dock 506, e.g. recency.

If a different external resource is now accessed by a member of the conversation, its icon will appear in the rightmost position of the dock 506 and the other icons will shift to left. If there are already three icons present when a new external resource is accessed, the leftmost icon will drop off the dock 506.

To draw attention to changes in status of the dock 506, it may be beneficial to provide an animation in which the new icon "pops" into place in the rightmost position. For example, as the other icons begin moving to the left, the new icon could be shown as scaling from half size to greater than normal size and then settling back to normal size. The appearance of status indicator 526 could similarly be animated in this manner to highlight a change in conditions that caused status indicator 526 to appear.

The active cell 512 from the drawer 510 is shown in one example to comprise an icon 610 corresponding to the external resource, the title 612 of the external resource, an indicator 614 showing that the external resource is currently in an active state, a list of names 616 of conversation participants currently playing a game or otherwise interacting with an external resource, and a "Call-to-Action" or CTA button 618 encouraging the viewer of the drawer 510 to join the active external resource. If the user presses the CTA button 618, they will join the external resource as a participant as defined by the particular external resource or the CTA button. Since an external resource is already active, it is not necessary to update the status indicator 526 or the shadow 608 in this case for conversation participants, but the icon corresponding to the external resource will in all likelihood be moved to the rightmost position in dock 506 and the active cell 512 may be moved to the top of the drawer 510 if it is not there already. To provide another visual indication that there has been at least a partial change in status, the status indicator 526 or the shadow 608 may also be pulsed.

The inactive cell 518 from the drawer 510 is shown in one example to comprise an icon 620 corresponding to the external resource, the title 622 of the external resource, a text indicator 624 showing that the external resource was opened recently, and a dismiss button 626 that can be used to dismiss the inactive cell 518 from the drawer 510. If it is dismissed, the inactive cell 518 will be removed from the dock 506 for all participants in the conversation, and if there is a corresponding icon in the dock 506 it will also be removed from there for all participants in the conversation.

If the user taps anywhere in inactive cell 518, the corresponding external resource will be accessed or launched. Also, the appearance of the cell will change to mimic the appearance of active cell 512 and this new active cell will be placed at the top of the drawer 510 for all participants in the conversation. Additionally, the dock 506 will be updated with the icon 620 appearing in the rightmost position of the dock 506 and status indicator 526 and shadow 608 will appear if they are not already present. If status indicator 526 and shadow 608 are already present, they may be pulsed to provide another visual indication to other conversation participants that there has been a change in status of the dock 506.

FIG. 7 shows a table with a summary of key actions users can take while interacting with the dock 506 and drawer 510 in one example implementation. Column A indicates user actions and row 1 indicates the status of external resources in the chat dock. For example, if there are two inactive external resources that were active in the specified retention time window (column D), and the user taps the dock 506 (row 2), the drawer 510 is opened as shown in cell D2 at the intersection of column D and row 2.

As can be seen from the table, the primary differences relate to whether there is more than one external resource (both referred to as an "app" in the table) that is present in the dock 506 and whether or not these are active or inactive. As shown in row 2, tapping on the dock 506 opens the corresponding external resource if there is only one external resource icon in the dock. With more than one icon in the dock 506, the drawer is opened. As shown in row three, only if there is a single inactive external resource can it be dismissed from the dock 506 by performing a press-and-hold movement followed by a drag or swipe. As shown in row 4, affordance in the form of a status indicator 526 (and shadow 608 if provided) is only shown if there are two or more external resources in the dock 506 with one of them being active. In the case of a single active external resource (c4), the number of active members of the conversation participating in the external resource are shown in place of status indicator 526. As shown in row 5, it is only possible to hide an external resource from the dock 506 directly if there is a single inactive external resource. Note however that an inactive external resource can always be dismissed from the dock in columns D to G by tapping on the dock to open the drawer 510 and dismissing the inactive external resource from within the drawer 510. This will dismiss the inactive external resource from all instances of the dock for members of the conversation. Finally, external resources can only be hidden from the drawer 510 by tapping the dismiss button 626 within the drawer 510 if they are inactive as shown in row 6. Active external resources cannot be hidden from the drawer 510 in this example embodiment.

Figure 8:
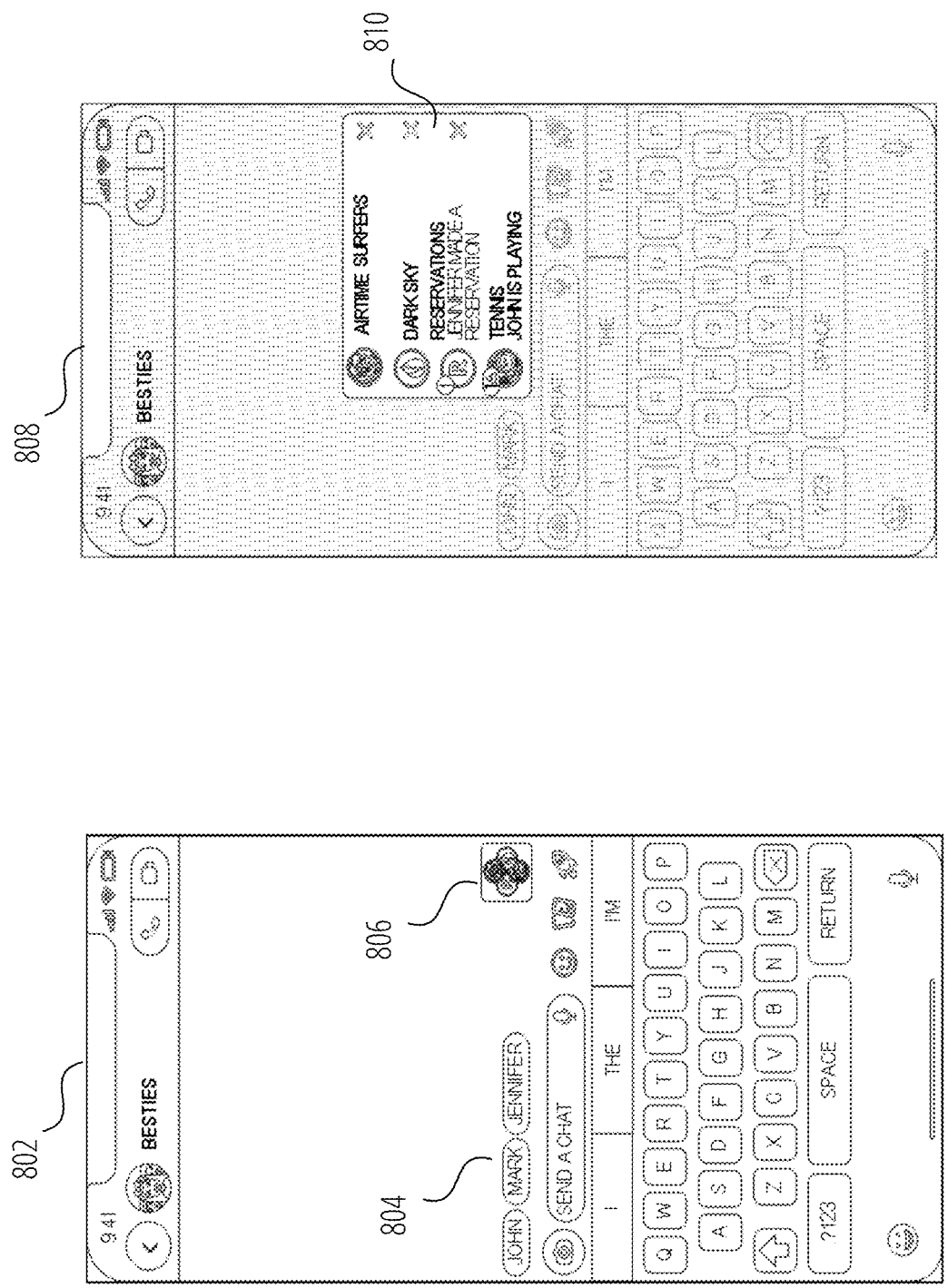
FIG. 8 illustrates user interfaces of the messaging application according to some further embodiments.

FIG. 8 shows illustrative user interfaces of the messaging application according to some further embodiments. For example, the user interfaces of the messaging application shown in FIG. 5 represent a conversation interface 502 between four participants that are part of a group named "Besties." Conversation interface 502 includes a presence region 504 that presents visual identifiers of participants in the group conversation. The visual identifiers in presence region 504 may include an avatar associated with each active participant and a name of each participant. Underneath the presence region 504 the messaging application presents a plurality of conversation options and a keyboard. The conversation options include a textual entry box in which a participant can type a message using the keyboard and the message is presented as a chat bubble above the presence region 504. Other conversation options include a camera option allowing a user to take a picture or video for submission to the conversation interface as a message in a chat bubble, and a rocket icon for accessing games.

Conversation interface also includes an external resource notification interface, shown as dock 806 in the illustrated embodiment, comprising two or more external resource icons that are either active for a member of the conversation or have recently been used by one or more members of the conversation. The time period in which an external resource is eligible for inclusion in the dock 806 is a matter of design preference, but in one example may be 80 hours. The dock 806 is a shared UI component within a conversation/chat session. All members of a conversation can see the icons in the dock 806 in this example. Features and variations of the dock 806 are discussed in more detail below with reference to FIG. 9.

Tapping on the dock 906 results in the display of conversation interface 808, in which a drawer 810 in the form of a list interface including user-selectable cells overlays a portion of the conversation interface 802, which in the illustrated example is "greyed out" to highlight that the drawer 810 is the active element in conversation interface 808. The user-selectable cells in the drawer 810 correspond to at least the applets whose icons are included in the dock 806. The drawer 810 is described in more detail below with reference to FIG. 10.

Figure 9:
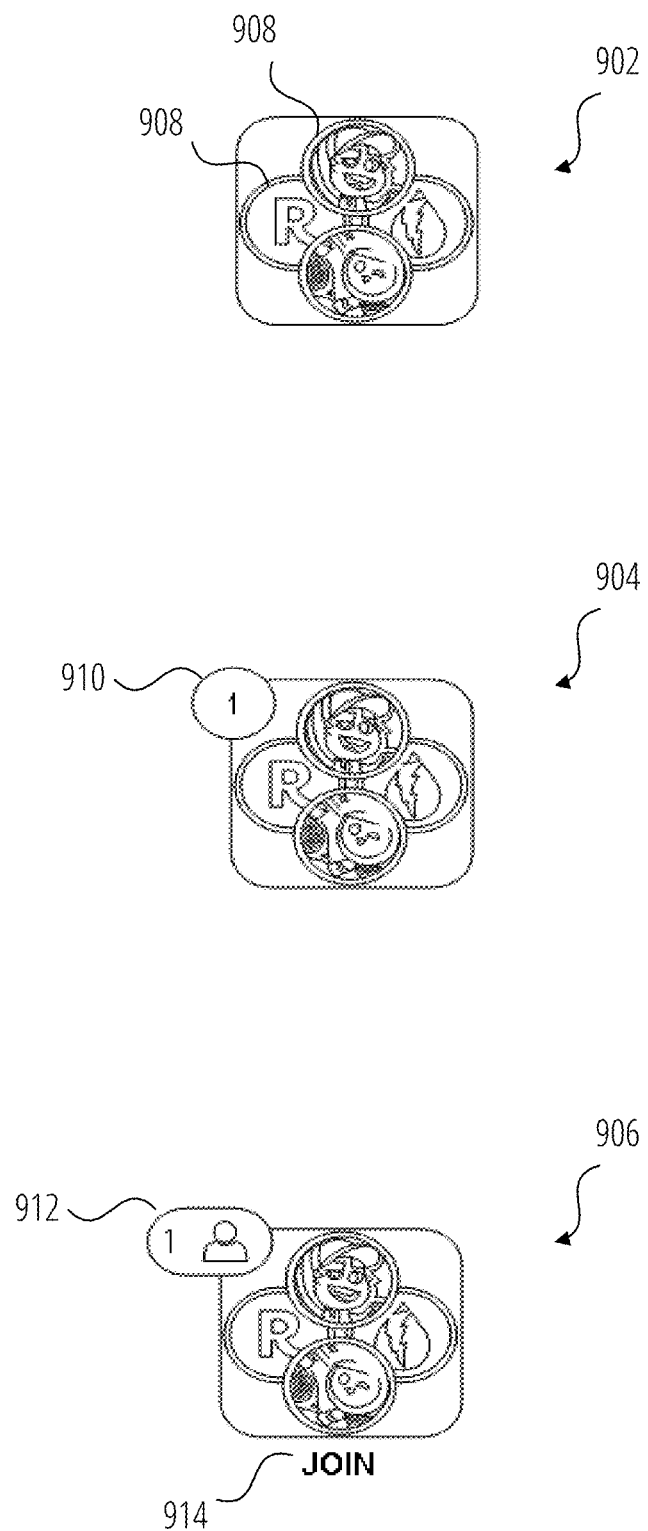
FIG. 9 illustrates three different presentations of the dock of FIG. 8 in accordance with some embodiments.

FIG. 9 illustrates three different presentations of the dock 806 of FIG. 8. Dock 902 is the default presentation in which no additional status or activity information relating to the external resources is displayed. As can be seen, the dock 902 includes four partially overlapping icons 908 arranged in two dimensions. The icons represent the last-used external resources by the members of the conversation/chat (identified in presence region 804).

Included with dock 904 is a status indicator 910, which indicates whether one or more of the external resources shown in the dock 904 have been used recently. In one example, the status indicator 910 is a circle of a particular color, e.g. yellow, that may be present to indicate a condition of an external resource that may be of interest (in this case recent usage), and absent when no such condition exists. The status indicator 910 may include a number to indicate how many of the external resources indicated by the icons 908 have been used recently. Other conditions may also be indicated, possibly using different colors. For example, other conditions under which the status indicator 910 may be present might be an active status of one or more external resources in the dock 904, an update to (or new features or levels available in) an external resource currently in the dock 904 or drawer 810, or an interaction with the particular external resource in some other manner by a member of the conversation, or activation by a friend who is not a conversation participant.

Alternatively, or in addition, other visual indicators may be used, depending on the state or nature of the external resources represented in the dock 806. For example, if a conversation participant is active in a participatory external resource (e.g. a multi-player game), then, as shown in dock 906, a status indicator 912 may be a distinctive color (e.g. green) and may include a number indicating how many members of the conversation are participating in the active external resource. The status indicator 912 may also include an additional signifier (e.g. a symbol representing a head and torso as shown) to indicate that the status indicator 912 relates to an external resource in which the user can participate with one or more of the conversation participants. The dock 906 may also include a call-to-action button 914, for example inviting the user to join other participants in the external resource. Tapping on the call-to-action button 914 may take the user directly to a user interface of the particular external resource, or may open the drawer 810.

If a different external resource is accessed than those currently shown in dock 806, the icon corresponding to the external resource that was accessed the longest time ago will be replaced by the icon for the most-recently accessed external resource.

To draw attention to changes in status of the dock 806, it may be beneficial to provide an animation in which the new icon "pops" into place. For example, the new icon could be shown as scaling from half size to greater than normal size and then settling back to normal size. The appearance of status indicator 910 or status indicator 912 could similarly be animated in this manner to highlight a change in conditions.

Figure 10:
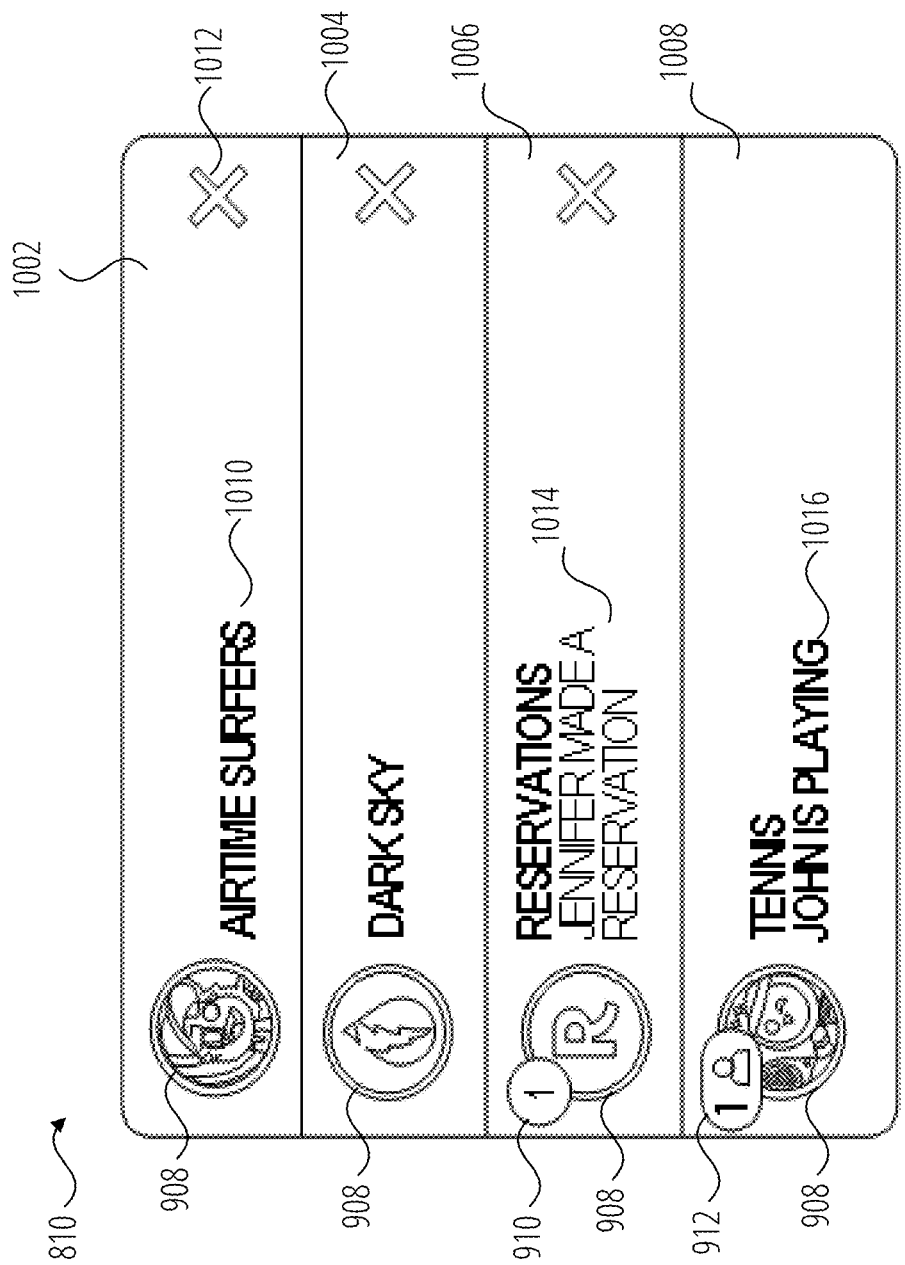
FIG. 10 illustrates the drawer illustrated in FIG. 8 in more detail.

FIG. 10 shows the drawer 810 of FIG. 8 in more detail. In the example shown, the drawer 810 comprises an inactive cell 1002, an inactive cell 1004, a cell 1006 in which a conversation participant has taken a noteworthy action, and an active cell 1008 representing a participatory external resource in which a conversation participant is active. In this regard, active and inactive refers to the current status of the external resource that is represented by the cell within the group comprising the conversation participants. All of the cells themselves in conversation interface 808 are "active" in the sense that user interaction with each cell is possible.

The cells in the drawer 810 may be ordered from top to bottom based on how long ago they were accessed, as discussed above with reference to FIG. 5. Furthermore, the number of icons in the dock 806 is not necessarily the same as the number of cells in the drawer 810.

In response to receiving a user selection of one of the cells from cell 1002 to cell 1008, the messaging application retrieves the HTML5 file (or other code) of the external resource system 214 associated with the selected cell and instantiates various resources to launch or access the corresponding external resource, either directly or by presenting a user interface of the external resource in the context of the messaging client 104. The particular behavior of the messaging application is determined by the particular external resource that has been launched or accessed. The status of the external resource in the dock 806 and drawer 810 in instances of these items in being presented to conversation participants will then be updated to reflect the new status of the external resource as being active.

The drawer 810 is typically the same no matter which participant in the conversation it is being presented to. Namely, one user's interactions with the drawer 510 affects the way another user in the same conversation sees the drawer 810.

Inactive cell 1002 and inactive cell 1004 from the drawer 810 are shown in one example to comprise an icon 908, corresponding to the external resource, a title 1010 of the external resource, and a dismiss button 1012 that can be used to dismiss these cells from the drawer 810. In such a case, the inactive cell will be removed from the drawer 810 for all participants in the conversation, and if there is a corresponding icon in the dock 806 it will also be removed from there for all participants in the conversation.

If the user taps anywhere in cell 1002 or cell 1004, the corresponding external resource will be accessed or launched. Also, the appearance of the cell will change for other conversation participants to mimic the appearance of an active cell (e.g. cell 1008) and the dock 806 will be updated with any relevant status indicator. If a status indicator 910 or status indicator 912 corresponding to a cell is already present in the dock, the icon or status indicator may be pulsed to provide another visual indication to other conversation participants that there has been a change in status of the dock 806, and the number of participants (if appropriate) may also be updated.

The cell 1006 from the drawer 810 is shown in one example also to comprise an icon 908 corresponding to the external resource, the title of the external resource, a status indicator 910 showing that the external resource has a reportable or noteworthy event or item associated with it. In this case, although the external resource corresponding to the cell 1006 is not active with one of the conversation participants, a conversation participant has taken a noteworthy action (in this case) with respect to the external resource. This may be reported by text 1014 underneath the title, indicating, for example, that a conversation participant has made a reservation using the corresponding external resource. Since cell 1006 is not active, it also includes a dismiss button 1012 that allows it to be dismissed from the drawer 810 and the dock 806.

If the user taps in the cell 1006 then the corresponding external resource will be opened or accessed as defined by the particular external resource as specified by the developer. In the illustrated embodiment, this may involve providing an interface to the external resource at a related state or location in the external resource, e.g. to the same restaurant or to the same reservation at the same restaurant, allowing the user to add themselves or ask to be added to the reservation in the illustrated embodiment.

Also, the appearance of cell 1006 will change to mimic the appearance of an active cell (e.g. Cell 1008) and the dock 806 will be updated with any relevant status indicator. If a status corresponding to a cell is already present in the dock, the icon or status indicator may be pulsed to provide another visual indication to other conversation participants that there has been a change in status of the dock 806, or changed in color and appearance, and the number of participants (if appropriate) may also be updated.

The active cell 1008 from the drawer 810 is shown in one example also to comprise an icon 908 corresponding to the external resource, the title of the external resource, a status indicator 912 showing that the external resource is currently in an active state, and text 1016 listing one or more names of conversation participants and the nature of their interaction with the external resource. In the illustrated embodiment, the text 1016 states that a conversation participant is playing a game. The text 1016, which could also be shown as a "Call-to-Action" or CTA button 618, encourages the viewer of the drawer 810 to join the active external resource. If the user taps cell 1008, they will join the external resource as a participant as defined by the particular external resource. The status indicator 912 will then be updated with the new number of participants and the text 1016 will be updated (for other conversation participants viewing the drawer 810) by adding the user's name. To provide another visual indication that there has been at least a partial change in status, the status indicator 912 may also be pulsed in the dock 806 for other conversation participants.

Figure 11:
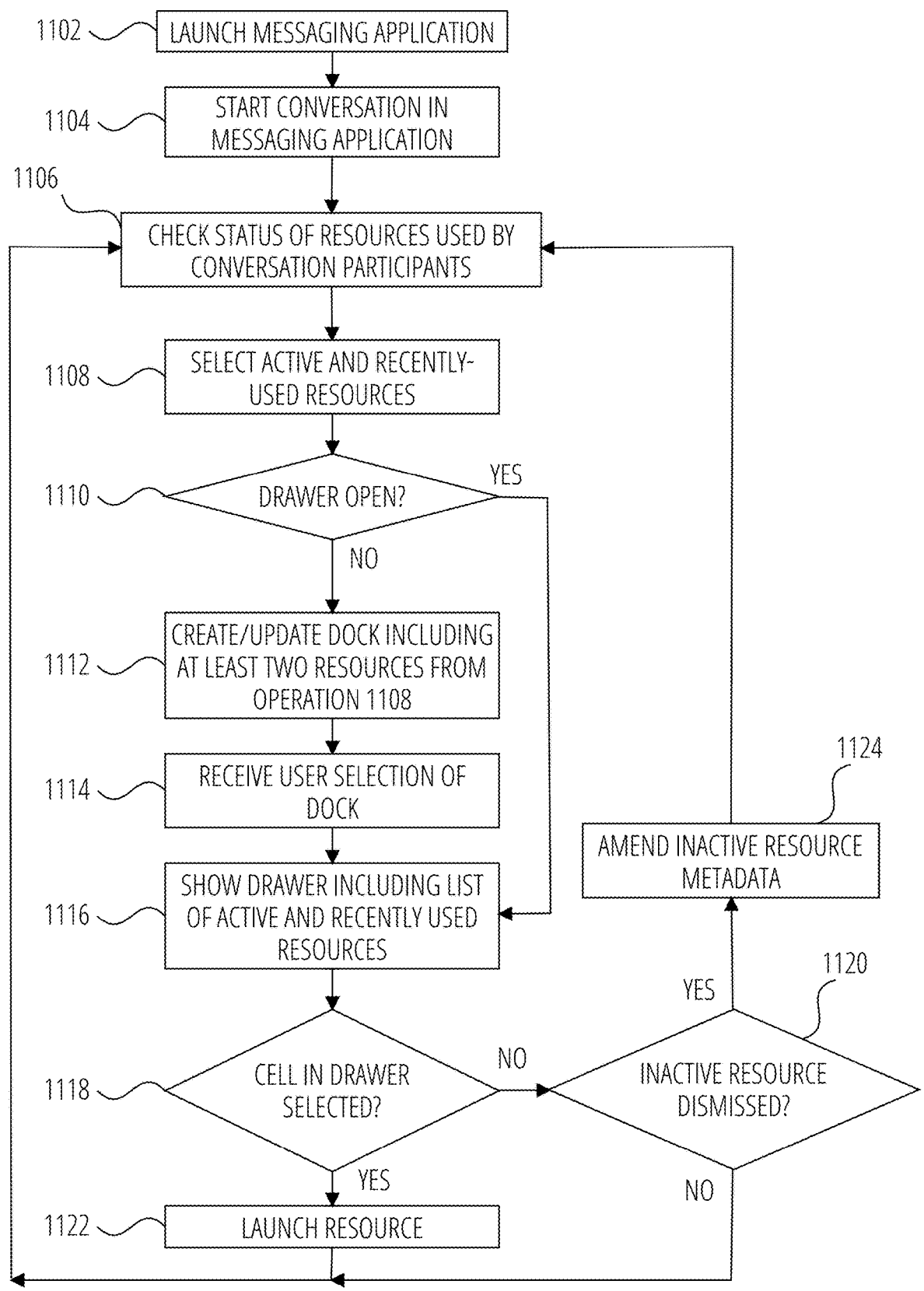
FIG. 11 is an example of a flowchart that may be used in an implementation of the user interface elements described herein.

FIG. 11 is an example of a flowchart that may be used in an implementation of the user interface elements described above.

The method commences with a user launching the messaging client 104 at operation 1102. A conversation is then started at operation 1104. This may be done in a number of ways known in the messaging art, for example by the user selecting an existing group of friends with whom to start a conversation, or selecting one or more friends from a contact list of friends with whom to start a conversation. The messaging client 104 may also have been configured to launch into the last chat session or in a default chat session set by the user.

The status of external resources used by participants in the conversation is checked at operation 1106 by the messaging client 104 and currently-active and recently used external resources (within a certain timeframe as discussed above) are selected in operation 1108. The messaging client 104 then determines in operation 1110 whether or not a list interface (e.g. drawer 510 or drawer 810) including user-selectable cells corresponding to the at least two external resources is open. In the first instance of the method, this will be "No" and the method will continue at operation 1112. In subsequent iterations of the method, the drawer may already be open and the method will then continue at operation 1116.

After a "No" determination in operation 1110, an external resource notification interface (e.g. dock 506 or dock 806) is created or updated in operation 1112 with at least two of the external resources selected in operation 1108 shown in the external resource notification interface. The position and appearance of the external resource notification interface may be as described above with reference to the description of dock 506 or dock 806, with external resource icons (e.g. icon 602 etc.) shown and ordered as described. In the event one or more of the external resources is active or has another noteworthy condition associated with it (e.g. recently updated, new levels etc.) then one or more indicators of external resource activity and/or the other conditions may be provided at, in or near the external resource notification interface, for example status indicator 526, shadow 608, status indicator 910 or status indicator 912.

The user may then select the external resource notification interface (e.g. dock 506 or dock 806) at operation 1114. In response to this selection, a list interface ((e.g. drawer 510 or drawer 810) is created in operation 1116, including a list of active and/or recently used external resources including at least the external resources identified in the external resource notification interface. The list of active and/or recently used external resources may be sorted and appear with one or more characteristics as described with reference to conversation interface 508 or conversation interface 808.

If an external resource is selected from the drawer as shown in operation 1118, the external resource is launched or accessed in operation 1122 by the messaging client 104 and the user is presented with the corresponding experience as is expected for the particular external resource. The status of the external resource (including its active status for the user and the fact that the user is a participant) is automatically updated when the external resource is accessed. The method then returns to operation 1106 where the status of external resources used by conversation participants is checked, and the method then continues from there. In some cases, the return to operation 1106 for the specific user who accessed the external resource may only occur once the user ceases use of the external resource and returns to the conversation interface.

If an external resource is not selected in operation 1118, a check is made to see if an inactive external resource has been dismissed from the list interface/drawer. If so, appropriate metadata relating to the external resource is amended or updated at operation 1124. In particular, the external resource may be flagged for temporary non-inclusion in the external resource notification interface and the drawer for the conversation participants, or the recency of use of the external resource for all participants, may be set to a value that would exclude it from selection in operation 1108. Alternatively, other records for the user or conversation participants may be updated to temporarily exclude inactive external resource from being displayed in the dock and drawer. The method then returns to operation 1106. If an inactive external resource is not dismissed in operation 1120, the method continues at operation 1106.

It should be noted that, for ease of explanation, the flowchart of FIG. 11 shows that the status of the external resources used by the participants is checked at a particular point in the method. In practice, the status of the external resources will be constantly checked at regular intervals or status updates that will affect the external resources shown in the dock and drawer will be received by the messaging client 104 as such updates occur, for example if another (remote) conversation participant interacts with a cell in the dock 506 as discussed above. That is, updates to the dock and drawer may occur at any time without the method having to wait for a certain step in the method to be completed before returning to check at operation 1106.

That is, while the flowchart shows operations as a sequential process, many of the operations can be performed in parallel or concurrently. In addition, the order of the operations may be re-arranged.

Machine Architecture

Figure 12:
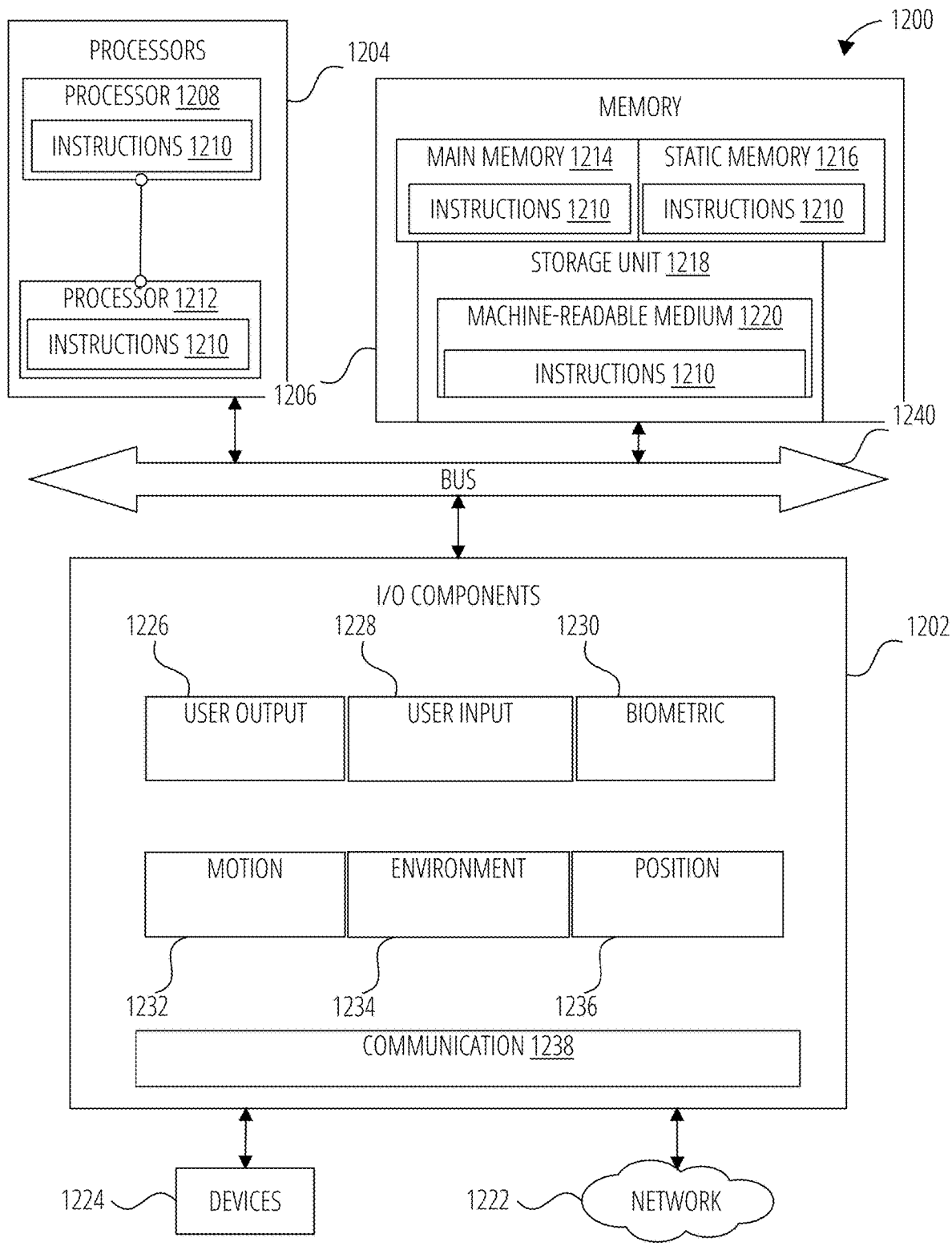
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
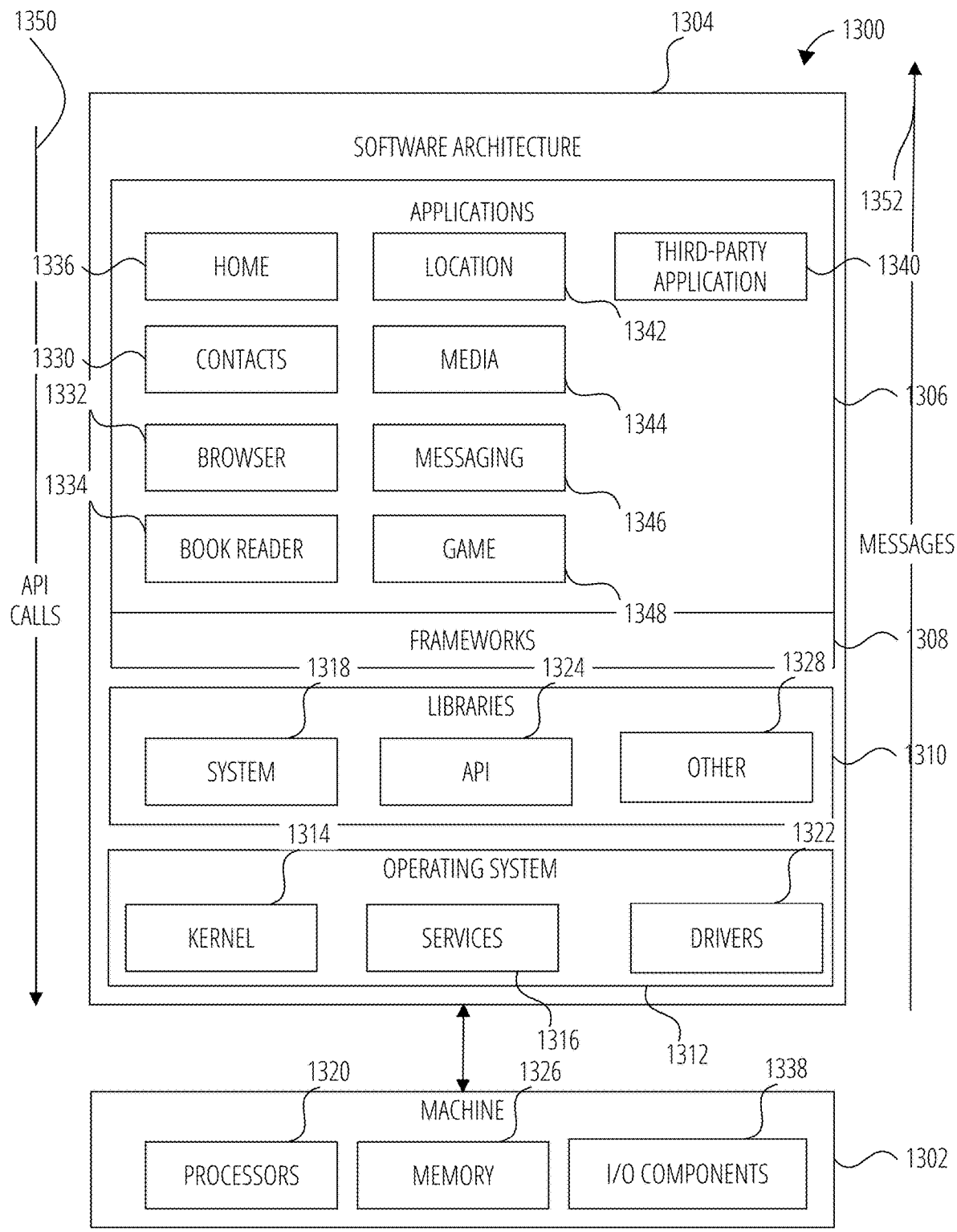
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1204/processors 1320 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

The invention claimed is:

1. A method of providing a conversation interface in a messaging application on a computing device, the conversation interface being presented to participants in a conversation that is being conducted on the messaging application, comprising:
determining statuses of at least two other applications that have been accessed by one or more of the participants in the conversation;
displaying an application notification interface in the conversation interface, the application notification interface including icons corresponding to the at least two other applications;
receiving a user selection of the application notification interface; and
displaying a selection interface including user-selectable cells corresponding to the at least two other applications in response to receiving the user selection of the application notification interface.

2. The method of claim 1, wherein the user-selectable cells in the selection interface are ordered first by currently active applications and then by recently active applications.

3. The method of claim 1, wherein the conversation interface comprises a text input region, a presence region above the text input region that shows visual identifiers corresponding to participants in a group conversation, and wherein the application notification interface is located adjacent to or overlapping the presence region.

4. The method of claim 1, further comprising:
receiving user selection of a particular application, of the at least two other applications, by a particular participant;
accessing the particular application for the particular participant; and
updating the application notification interface and the selection interface for other participants according to a newly-active status of the particular application.

5. The method of claim 4, wherein a user-selectable cell in the selection interface corresponding to the particular application is updated to include a name of the particular participant.

6. The method of claim 4, wherein a user-selectable cell in the selection interface corresponding to the particular application includes a call to action button for other participants in the conversation that are not active in the particular application, to join the particular application.

7. The method of claim 4, further comprising:
updating the application notification interface by displaying an icon corresponding to the particular application in a first location in the application notification interface.

8. The method of claim 4, further comprising:
updating the application notification interface with a status indicator to indicate that at least one of the applications corresponding to the icons in the application notification interface is active for at least one participant in the conversation.

9. The method of claim 1, further comprising:
receiving a user input to dismiss a selected inactive application from the selection interface; and
removing a user-selectable cell corresponding to the selected inactive application from the selection interface.

10. A system comprising:
one or more processors of a machine; and
a memory storing instructions for providing a conversation interface in a messaging application, the conversation interface being presented to participants in a conversation that is being conducted on the messaging application, the instructions when executed by at least one processor among the one or more processors, causes the machine to perform operations comprising:
determining statuses of at least two other applications that have been accessed from within a context of the messaging application, by one or more of the participants in the conversation;
causing displaying of an application notification interface in the conversation interface, the application notification interface including icons corresponding to the at least two other applications;
receiving a user selection of the application notification interface; and
causing displaying of a selection interface including user-selectable cells corresponding to the at least two other applications in response to receiving the user selection of the application notification interface.

11. The system of claim 10, the operations further comprising:
receiving user selection of a particular application, of the at least two other applications, by a particular participant;
accessing the particular application for the particular participant; and
updating the application notification interface and the selection interface for other participants according to a newly-active status of the particular application.

12. The system of claim 11, wherein a user-selectable cell in the selection interface corresponding to the particular application is updated to include a name of the particular participant.

13. The system of claim 11, wherein a user-selectable cell in the selection interface corresponding to the particular application is selectable by other participants in the conversation that are not active in the particular application, to join the particular application.

14. The system of claim 11, further comprising the operation of:
updating the application notification interface with a status notification to indicate that at least one of the applications corresponding to the icons in the application notification interface is active for at least one participant in the conversation.

15. The system of claim 10, further comprising the operations of:
receiving a user input to dismiss a selected inactive application from the selection interface; and removing a user-selectable cell corresponding to the selected inactive application from the selection interface.

16. A non-transitory machine-readable storage medium embodying instructions for providing a conversation interface in a messaging application, the conversation interface being presented to participants in a conversation that is being conducted on the messaging application, the instructions, when executed by a device, cause the device to perform operations comprising:
    determining statuses of at least two other applications that have been accessed from within a context of the messaging application, by one or more of the participants in the conversation;
    causing displaying of an application notification interface in the conversation interface, the application notification interface including icons corresponding to the at least two other applications;
    receiving a user selection of the application notification interface; and
    causing displaying of a selection interface including user-selectable cells corresponding to the at least two other applications in response to receiving the user selection of the application notification interface.

17. The non-transitory machine-readable storage medium of claim 16, wherein the conversation interface comprises a text input region, a presence region above the text input region that shows visual identifiers corresponding to participants in a group conversation, and wherein the application notification interface is located adjacent to or overlapping the presence region.

18. The non-transitory machine-readable storage medium of claim 16, the operations further comprising:
    receiving user selection of a particular application, of the at least two other applications, by a particular participant;
    accessing the particular application for the particular participant; and
    updating the application notification interface and the selection interface for other participants according to a newly-active status of the particular application.

19. The non-transitory machine-readable storage medium of claim 18, the operations further comprising:
    updating the application notification interface by displaying an icon corresponding to the particular application in a first location in the application notification interface.

20. The non-transitory machine-readable storage medium of claim 18, the operations further comprising:
    updating the application notification interface with a status notification to indicate that at least one of the applications corresponding to the icons in the application notification interface is active for at least one participant in a conversation.

* * * * *